US006873770B2

United States Patent
Leung et al.

(10) Patent No.: US 6,873,770 B2
(45) Date of Patent: Mar. 29, 2005

(54) OPTICAL FIBER ARRAY

(75) Inventors: Bernard Nai Wing Leung, Hong Kong (CN); Kwok Chi Hung, Hong Kong (CN); Chung Yuen Lo, Hong Kong (CN); John Tak On Tsun, Hong Kong (CN); Alex Chun Kwan So, Hong Kong (CN); Doris Po Fai Tam, Hong Kong (CN)

(73) Assignee: Photonics Manufacturing Service Ltd., Hong Kong (CN)

( * ) Notice: Subject to any disclaimer, the term of this patent is extended or adjusted under 35 U.S.C. 154(b) by 185 days.

(21) Appl. No.: 10/219,430

(22) Filed: Aug. 14, 2002

(65) Prior Publication Data

US 2003/0133688 A1 Jul. 17, 2003

Related U.S. Application Data

(60) Provisional application No. 60/362,726, filed on Mar. 8, 2002, and provisional application No. 60/347,252, filed on Jan. 14, 2002.

(51) Int. Cl.[7] .............................. G02B 6/26; G02B 6/42; G02B 6/00
(52) U.S. Cl. ......................................... 385/52; 385/137
(58) Field of Search ............................ 385/51, 52, 136, 385/137

(56) References Cited

U.S. PATENT DOCUMENTS

| | | | | |
|---|---|---|---|---|
| 4,818,059 A | * | 4/1989 | Kakii et al. ................. | 385/65 |
| 5,315,678 A | * | 5/1994 | Maekawa et al. ............ | 385/59 |
| 5,379,360 A | * | 1/1995 | Ota et al. .................... | 385/59 |
| 5,482,585 A | * | 1/1996 | Ota et al. .................... | 156/158 |

* cited by examiner

*Primary Examiner*—Joseph Williams
*Assistant Examiner*—Peter Macchiarolo
(74) *Attorney, Agent, or Firm*—Heath W. Hoglund

(57) ABSTRACT

One preferred optical fiber array according to the present invention includes a lower substrate, a ribbon cable, a cover and a housing. The lower substrate has a first end and a second end opposed thereto and an upper surface extending between the first end and the second end. The upper surface defines a plurality of grooves that extend across at least a portion of the upper surface. The ribbon cable comprising a plurality of coated optical fibers. An end of the coated optical fibers are bare of the coating. At least a portion of the bare end of each of the plurality of coated fibers rests in one of the plurality of grooves and extend to the first end of the lower substrate. The cover is positioned proximate the first end of the lower substrate and over at least a portion of the bare end of each of the plurality of coated fibers. The cover is bonded to the lower substrate. The housing has a first end and a second end opposed thereto, a bottom surface extending between the first end and the second end, and a bottom step separating the bottom surface into an upper and a lower level. The housing is bonded to the lower substrate along the upper level of the bottom surface and along the bottom step. The housing and the lower substrate define an interior channel having a first portion bounded by the lower substrate and the housing and a second portion bounded only by the housing. The first portion meets the second portion at the bottom step. The first portion is narrower than the second portion. The ribbon cable passes through the interior channel. An adhesive is applied to fill the gaps between the ribbon cable and the interior channel.

27 Claims, 8 Drawing Sheets

OPTICAL FIBER ARRAY

CLAIM OF PRIORITY

This application claims the benefit of priority to provisional patent application Nos. 60/362,726, filed Mar. 8, 2002, and 60/347,252, filed Jan. 14, 2002.

FIELD OF THE INVENTION

The invention relates generally to an optical fiber array.

BACKGROUND OF THE INVENTION

In order to meet the demand of high density, high transmission rate, reduction of component size, and high production scalability, the development of the Planar Lightwave Circuit (PLC) and related waveguide packaging is undoubtedly the trend in the optical networking industry. Optical fiber arrays are used for the connection of light input/output ends of optical fibers to the waveguide substrate. Since the alignment accuracy for the above connection is down to the submicron level, the fabrication of the optical fiber array is crucial to achieve and maintain the high production yield of PLC devices. Moreover, to increase the density and reduce the size of the waveguide, efforts are made to reduce the waveguide pitch and thus the inter-fiber pitch of the fiber array down to 127 μm which is about half of the standard-type waveguide pitch of 250 μm.

A standard-type full-pitch optical fiber array 100 is shown in FIG. 1. It generally comprises a lower V-groove substrate 101, a cover lid 102 and optical fibers 103. Ultraviolet-(UV-) or thermal-curable adhesive 105 is used for fixing a bare end of the optical fibers 103 into V-shaped grooves of substrate 101. UV-curable adhesive 106 is used for fixing ribbon fibers 104 onto the V-groove substrate 101. However, the bonding surface at interface 107 between ribbon fibers 104 and V-groove substrate 101 is very thin. Consequently, the adhesion at interface 7 is very weak. Especially for high-channel optical fiber arrays (more than 16 channels/fibers), it is very easy to cause failure at the interface 107 when subjected to a side pull test.

An example of a conventional half-pitch fiber array 200 is shown in FIG. 2. A ribbon fiber housing lid 210 is fixed to a lower V-groove substrate 208. Ribbon fibers 211a and 211b, which are arranged in two stages, are inserted through a housing groove 212 formed in the ribbon fiber housing lid 210 so that the upper and lower fibers are alternatively aligned in the V-shaped grooves. Then, an upper cover lid 209 is fixed to the lower V-groove substrate 208 therein to form the optical fiber array 200. Normally, UV- or thermal-curable adhesive 213 is used for fixing bare fibers 214a and 214b into V-shaped grooves of the lower V-groove substrate 208, and for fixing of ribbon fibers 211a and 211b inside a housing groove 212. In this configuration of a half-pitch fiber array, the ribbon fiber housing lid 210 can improve the side pull strength when compared to the case of using only a single drop adhesive 106 as shown in FIG. 1. However, the adhesion of interface 215 is still relatively weak because there is only a very thin layer of adhesive 213 at the interface 215 between ribbon fibers 211b and the V-groove substrate 208. Moreover, in order to reduce the bending loss of bare fibers 214a and 214b, the length, shown as "d," of ribbon fibers 211a and 211b inside the housing groove 212 is generally quite short (typically around 4 mm). As a result, when the fiber array 200 is subjected to a side pull test, cracks may initiate in the interface 215 and may propagate to the bare optical fibers 214a and 214b. This may further break the bare optical fibers 214a and 214b and degrade or ruin system performance.

Related prior art patents that suffer from this or other limitations are shown in U.S. Pat. No. 6,231,244, issued to Fukuyama et al.; U.S. Pat. No. 6,160,937, issued to Fukuyama et al.; and U.S. Pat. No. 5,379,360, issued to Ota et al.; each of which is expressly incorporated herein by reference in their entirety.

SUMMARY OF THE INVENTION

The present invention addresses the problems described above and associated with conventional optical fiber arrays. Accordingly, it is an object of the invention to provide an optical fiber array that has a strong mechanical strength when subjected to mechanical stress. This, in turn, improves product reliability.

It is a further object of the present invention to enhance the side pull strength at the interface between the ribbon fibers and the bottom surface of the housing groove. Accordingly, one aspect of the present invention provides a step portion in the housing groove of the ribbon fiber housing boot. This is filled with a relatively thicker layer of adhesive between the ribbon fibers and the bottom surface of the housing groove, and thereby enhances the side pull strength.

It is a further object of the invention to enhance the adhesion between the ribbon fiber housing boot and the lower V-groove substrate. Accordingly, one further aspect of the invention provides an L-shaped ribbon fiber housing boot. This L-shape introduces an additional bonding surface between the ribbon fiber housing boot and the lower V-groove substrate, and thereby enhances adhesion.

It is a further object of the invention to enhance the side pull strength as the ribbon fibers enter the ribbon fiber housing boot. Accordingly, one further aspect of the present invention provides a fillet-shaped adhesive formed at the corner between the ribbon fibers and the edge of the ribbon fiber housing boot. This helps to reduce stresses that may occur at this interface and thereby helps to reduce the possibility of forming a crack or break.

According to one aspect of the invention, an optical fiber array includes a lower substrate, a ribbon cable, a cover and a housing. The lower substrate has a first end and a second end opposed thereto and an upper surface extending between the first end and the second end. The upper surface defines a plurality of grooves that extend across at least a portion of the upper surface. The ribbon cable includes a plurality of coated optical fibers. An end of the coated optical fibers are bare of the coating. A portion of the bare end of each of the plurality of coated fibers rests in one of the plurality of grooves and extend to the first end of the lower substrate. The cover is positioned proximate the first end of the lower substrate and over the portion of the bare end of each of the plurality of coated fibers. The cover is bonded to the lower substrate. The housing has a first end and a second end opposed thereto, a bottom surface extending between the first end and the second end, and a bottom step separating the bottom surface into an upper and a lower level. The housing is bonded to the lower substrate along the upper level of the bottom surface and along the bottom step. The housing and the lower substrate define an interior channel having a first portion bounded by the lower substrate and the housing and a second portion bounded only by the housing. The first portion meets the second portion at the bottom step. The first portion is narrower than the second portion. The ribbon cable passes through the interior channel.

According to further aspects of the invention, the upper surface defines an optical fiber step between the first end and the second end of the lower substrate. The plurality of grooves extend from the optical fiber step to the first end of the lower substrate. The plurality of grooves are V-shaped. The ribbon cable includes a first ribbon cable resting on a second ribbon cable. The bare ends of the plurality of coated fibers resting in the plurality of grooves alternate between a bare end of a coated fiber from the first ribbon cable and a bare end of a coated fiber from the second ribbon cable. The cover has a first end and a second end and a lower surface extending from the first end to the second end. The first end of the cover is flush with the first end of the lower substrate. The lower surface of the cover and the plurality of grooves define a plurality of parallel channels each enclosing a portion of the bare end of each of the plurality of coated fibers. The second end of the cover and the first end of the housing define a gap. At least a portion of the bare end of each of the plurality of coated fibers extends past the second end of the cover and into the gap.

According to further aspects of the invention, the optical fiber array includes a plurality of adhesives. At least one of the adhesives cover the portion of the bare end of each of the plurality of coated fibers that extend past the second end of the cover and into the gap. The housing further comprises a pair of inclined L-shaped walls extending upward from the bottom surface and extending from the first end to the second end of the housing. The housing and the ribbon cable define an upper gap that extends along an upper surface of the ribbon cable and a lower gap that extends along at least a portion of a lower surface the ribbon cable. A first height of the first portion of the interior channel approximately matches that of the ribbon cable and the upper gap. A second height of the second portion of the interior channel approximately matches that of the ribbon cable, the upper gap and the lower gap. Thus, the second height of the second portion of the interior channel is greater than the first height of the first portion of the interior channel. The plurality of adhesives substantially fill the upper gap and the lower gap and forms a pair of beads. One of the beads extends along an upper corner defined by the second end of the housing and an upper face of the ribbon cable. One of the beads extends along a lower corner defined by the second end of the housing and a lower face of the ribbon cable.

According to another aspect of the invention, an optical fiber array includes a substrate, a housing and a ribbon fiber cable. The substrate has a joint end and a housing end and an upper surface extending between the joint end and the housing end. The upper surface defines a plurality of parallel grooves extending along at least a portion of the upper surface. The cover is positioned over at least a portion of the plurality of parallel grooves so that the cover and the substrate define a plurality of parallel channels each bounded by one of the plurality of parallel grooves and the cover. The housing is joined to the substrate along at least a portion of the upper surface of the substrate and at least a portion of the housing end of the substrate. The housing defines an interior channel having a step that separates the interior channel into a wide portion and a narrow portion. The ribbon fiber cable has a plurality of individual optical fibers that terminate in a bare end. The ribbon fiber cable first passes through the wide portion of the interior channel, then through the narrow portion of the interior channel and then at least a portion of the bare end of each of the plurality of individual optical fibers pass through one of the plurality of parallel channels to terminate approximately even with the joint end of the substrate.

According to further aspects of the invention, the upper surface of the substrate defines a step. The plurality of parallel grooves extend from the step to the joint end of the substrate. The cover and the housing are joined to the substrate so that they define a step gap through which at least a portion of the bare end of each of the plurality of individual optical fibers pass through before entering the plurality of channels. At least one adhesive covers the portion of the bare end of each of the plurality of individual optical fibers that pass through the step gap. The housing includes a pair of side walls each having a horizontal leg and a vertical leg. The housing is bonded to the upper surface of the substrate along the horizontal leg of the side walls. The housing is also bonded to the housing end of the substrate along the vertical leg of the side walls. The narrow portion of the interior channel is further defined by the upper surface of the substrate at least along a bottom wall of the narrow portion of the channel.

According to another further aspect of the invention, the plurality of individual optical fibers of the ribbon fiber cable are arranged in parallel along a single plane. According to another further aspect of the invention, the ribbon fiber cable comprises an upper and a lower ribbon fiber cable and the plurality of individual optical fibers of the upper and lower ribbon fiber cables are intermingled as they pass through the plurality of parallel channels.

According to another aspect of the invention, an optical fiber array especially suited for joining optical fibers includes a substrate, a plurality of coated optical fibers, a cover, and an adhesive. The substrate has an upper surface extending between a first and a second end of the substrate. The upper surface defines a plurality of grooves. The plurality of coated optical fibers extend across the upper surface of the substrate and rest in the plurality of groves defined by the upper surface. The plurality of coated optical fibers have a bare end flush with the first end of the substrate. The plurality of coated optical fibers extend beyond the second end of the of the substrate. The cover has a lower surface extending between a first and a second end of the cover. The lower surface defines a plurality of grooves complementary to the plurality of grooves defined in the upper surface. The lower surface of the cover rests upon the upper surface of the substrate so that the first end of the cover is flush with the first end of the substrate and the bare end of the plurality of coated optical fibers and so that a portion of the bare end of the plurality of coated optical fibers are sandwiched between the substrate and the cover. The bare end of the plurality of coated optical fibers extends beyond the second end of the cover. The adhesive is bound to the substrate, the plurality of coated optical fibers and the cover. The adhesive covers the bare portion of the plurality of optical fibers. The adhesive forms a first continuous bead along an interior corner joint of the plurality of coated optical fibers.

According to further aspects of the invention, the upper surface of the substrate defines a step. The plurality of grooves extend from the first end of the substrate to the step. The cover extends from the first end of the substrate to the step, so that the second end of the cover meets the step. The housing has a top and a pair of side walls extending down along opposite sides of the top from a first end to a second end of the top so that the top and the pair of side walls define an interior channel. The pair of side walls rest upon the upper surface of the substrate so that a portion of the plurality of coated optical fibers are enclosed by the housing. The adhesive is bound to the first end of the top and fills a gap defined between the second end of the cover and the first end of the top. Only a portion of the side walls of the housing rest upon the upper surface of the substrate, and a portion of the side walls of the housing extend past the second end of the substrate so that the side walls form an L-shape. The pair of side walls of the housing are inclined so that the side walls meet the top at an obtuse angle. The substrate further has a pair of side walls extending from the first end to the second end and wherein the pair of side walls of the housing meet the substrate proximate the side walls of the substrate and wherein the side walls of the housing are inclined with respect to the side walls of the substrate. The adhesive forms a second continuous bead along a second interior corner of the plurality of covered optical fibers. The first and the second continuous beads define a concave surface.

According to another further aspect of the invention, the plurality of coated optical fibers comprise a first ribbon of coated optical fibers connected in parallel along a width of the ribbon. According to another further aspect of the invention, the plurality of coated optical fibers comprise a second ribbon of coated optical fibers separate from the first ribbon of coated optical fibers. The first ribbon of coated optical fibers rest in the plurality of groves defined by the upper surface of the substrate. The portion of the bare end of the coated optical fibers of both the first and second ribbon are sandwiched between the substrate and the cover.

According to another aspect of the invention, an optical fiber array includes a substrate, a cover, a housing and at least one adhesive. The substrate provides support for at least one ribbon fiber. The substrate defines a plurality of grooves each of which are configured to house a bare optical fiber. The substrate and the housing define a channel having a narrow portion and a wide portion separated by a step. The at least one adhesive covers a gap defined by the substrate, the cover and the housing.

These and further object and aspects of the invention will be better appreciated with reference to the drawings and the following detailed description of the invention.

BRIEF DESCRIPTION OF THE DRAWINGS

FIG. 4b is a schematic perspective view of the full-pitch optical fiber array of FIG. 4a.

FIG. 5b is a schematic perspective view of the half-pitch optical fiber array of FIG. 5a.

DETAILED DESCRIPTION OF THE INVENTION

Figure 3:
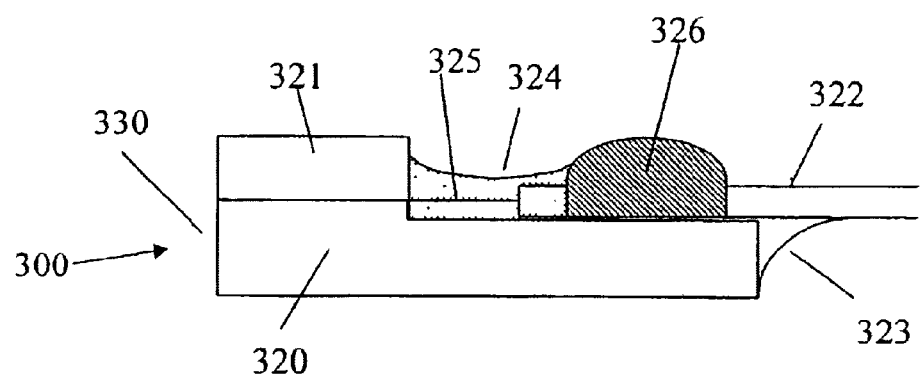
FIG. 3 is a schematic side view showing one preferred embodiment of a full-pitch optical fiber array according to the present invention.

Preferred embodiments of the invention are now described with reference to the drawings. Referring to FIG. 3, an optical fiber array according to one preferred embodiment is explained. The optical fiber array 300 includes a lower V-groove substrate 320, a cover lid 321 and ribbon fibers 322. The lower V-groove substrate 320 can be made of silicon, quartz or Pyrex (which is a trade name of a glass-like composite manufactured by Corning Inc.). The ribbon fibers 322 is stripped away leaving bare optical fibers 325. Each of these pass into individual channels defined by lower V-groove substrate 320 and cover lid 321. The bare optical fibers 325 extend flush with the end 330 of lower V-groove substrate 320 and cover lid 321. UV or thermal curable adhesive (not shown) is used for fixing of bare fibers 325 into V-shaped grooves of the substrate 320. The ribbon fibers 322 are bonded to the lower V-groove substrate 320 by adhesive 326. A UV-curable silicon adhesive 324 is used to protect the portion of the bare fibers 325 that is exposed between adhesive 326 and cover lid 321.

In addition, a fillet-shaped UV-curable adhesive 323 is applied along the corner between the ribbon fibers 322 and the upper edge of the lower V-groove substrate 320. This fillet-shaped adhesive 323 preferably has a low coefficient of thermal expansion (CTE), high water resistance, and most importantly, a strong adhesion to the resin surface of the ribbon fibers 322. This fillet-shaped adhesive 323 substantially improves the side-pull strength of optical fiber array 300. The combined construction improves mechanical strength and protects against mechanical impact.

The preferred embodiment described with reference to FIG. 3 is particularly suited for the fabrication of low-channel optical fiber arrays (i.e., up to 16 channels/fibers). However, to have more channels/fibers (i.e., more than 16 channels/fibers) in the optical fiber array, it is preferred to have a ribbon fiber housing cover to fix the ribbon fibers onto the lower V-groove substrate. This helps to maintain a good mechanical reliability of the optical fiber array product.

Figure 4A:
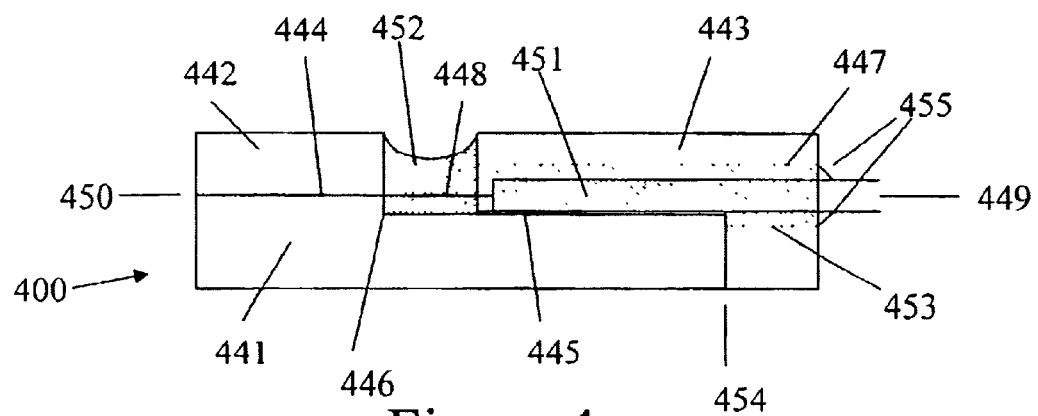
FIG. 4a is a schematic side view showing another preferred embodiment of a full-pitch optical fiber array with a ribbon-fiber housing according to the present invention.
Figure 4B:
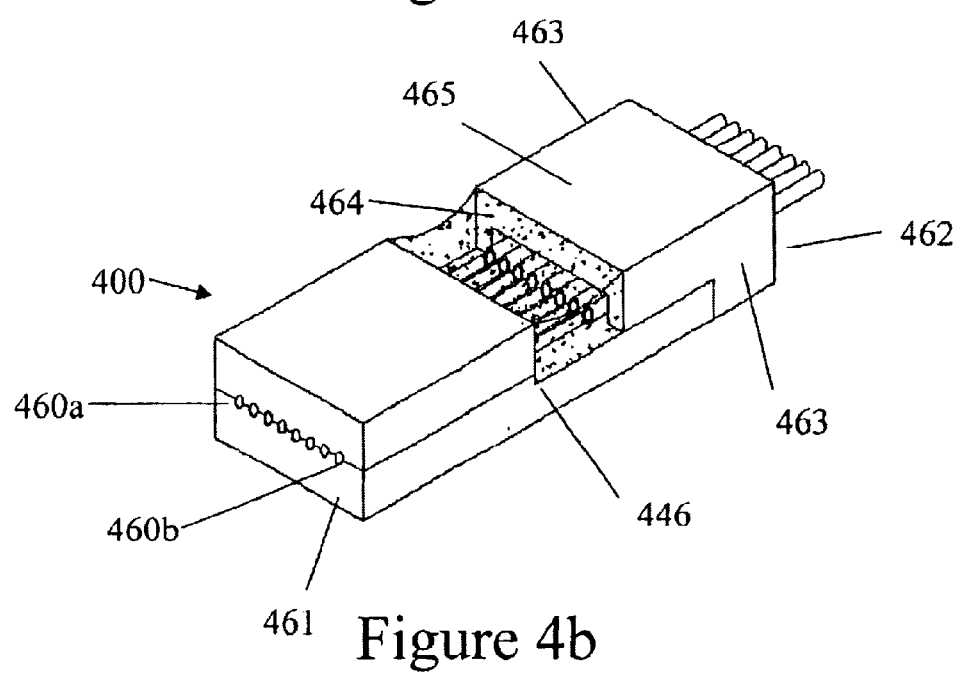

Referring now to FIGS. 4a and 4b, one preferred full-pitch optical fiber array is explained. The optical fiber array 400 includes a lower V-groove substrate 441, a cover lid 442, a ribbon fiber housing boot 443 and ribbon fibers 449. A plurality of V-shaped grooves are formed in parallel in the upper surface of lower V-groove substrate 441. Cover lid 442 is positioned above the V-shaped grooves in the lower substrate 441 to define a plurality of enclosed channels beginning with leftmost channel 460a and extending to rightmost channel 460b. The bare fibers 448 are placed in the plurality of V-shaped grooves in the lower substrate 441 and cover lid 442 presses these bare fibers 448 in place.

The ribbon fiber housing boot 443 likewise presses the covered ribbon fibers 449 in place. More specifically, it defines an interior channel 447. On the ribbon fiber end 462 of the ribbon fiber housing boot 443, the interior channel 447 is completely defined by the ribbon housing fiber boot 443. In other words, the ribbon fiber housing boot 443 defines the top, bottom and sides of the interior channel 447 on the end proximate to ribbon end 462. For assembly, the ribbon fibers 449 are threaded through this channel 447 from the ribbon end 462.

Ribbon fiber housing boot 443 narrows at step 454 so that its side walls 463 form an L-shape (i.e., its side walls 463 each have a horizontal and vertical member). The step 454 extends into interior channel 447 so that the gap end 464 of ribbon fiber housing boot 443 has only a top 465 and the pair of side walls 463. When the ribbon fiber housing boot 443 is place on top of the lower substrate 441, the bottom of the interior channel 447 proximate the gap end 464 is formed by the lower substrate 441. Since the step 454 extends into interior channel 447 the channel narrows at that point. For assembly, the ribbon fibers 449 rest upon the upper surface of lower substrate 441. Since the portion of interior channel 447 is wider between ribbon end 462 and step 454, a correspondingly larger gap is formed between the ribbon fibers 449 and the ribbon fiber housing boot 443. A relatively even gap is formed along the top of the ribbon fibers 449 and the top of the interior channel 447. Of course, these gaps widen slightly where the coating on ribbon fibers 449 terminates.

The upper surface of lower V-groove substrate also defines a step 446. The V-shaped groove section of the upper surface 444 extends from this step to the joint end 461 of the optical fiber array 400. The height of step 446 is approximately half of the diameter of the ribbon fibers. This minimizes any bending and associated losses in the bare optical fibers 448.

Preferably the ribbon fiber housing boot 443 is made of metal, engineering plastic or resin formed in a mold. When compared to the more common method of grinding a boot from a solid block, the fabrication and manufacturing costs are significantly reduced.

During assembly, the bare optical fibers are inserted and located in the V-shaped groove section of the upper surface 444 and the ribbon fibers 449 are run through the interior channel 447 defined by the lower substrate 441 and the ribbon fiber housing boot 443. The bare optical fibers 448 extend flush with joint end 461 of the fiber array 400. An adhesive 450 is then applied between the cover lid 442 and the lower substrate 441 so that it fills, as much as possible, the gaps between V-shaped groove section of the upper surface 444 and the bare optical fibers 448. It also bonds the cover lid 442 to the lower substrate 441.

An adhesive 451 is applied between the ribbon fiber housing boot 443 and lower substrate 441 so that it fills, as much as possible, the gaps between the interior channel 447 and the ribbon fibers 449. More specifically, the gaps 445 between the upper surface of the lower substrate 441 and the ribbon fibers 449 are filled with adhesive 451. Likewise, the gaps 453 between the bottom of ribbon fiber housing boot 443 and the ribbon fibers 449 are filled with adhesive 451. Because the gaps 445 widen as they pass over step 454 to gaps 453, a thicker layer of adhesive 451 is applied. This thicker layer of adhesive 451 enhances the strength of the interface between the ribbon fibers 449 and the bottom surface of interior channel 447. A relatively thick layer of adhesive 451 is also applied along the entire gap between the ribbon fibers 449 and the upper surface of the interior channel 447. This also enhances the strength of the interface between the ribbon fibers 449 and the upper surface of interior channel 447. As the ribbon fibers 449 are pulled up or down in a side pull test, the relatively thick layer of adhesive 451 proximate the ribbon end 462 provides a small degree of flexibility so that the ribbon fibers do not experience a sharp pressure at the ribbon end 462 of ribbon fiber housing boot 443.

The adhesive 451 also bonds the ribbon fiber housing boot 443 and lower substrate 441. The shape of the side walls 463 provides two bonding surfaces (one along each interior leg of the L-shaped side walls 463) that help to increase the strength of this joint. Specifically, the interior portion of the vertical member provides one bonding surface with the end of lower substrate 441. The bottom of the horizontal member provides a second bonding surface with the top of lower substrate 441. Together, these enhance the bond between the lower substrate 441 and the upper fiber housing boot 443. In conventional designs such as the one shown in FIG. 2, stress on the ribbon fibers 449 during a side pull test would tend to separate the ribbon fiber housing boot 210 from the lower substrate 208, especially over an extended period of use. Because the channel 447 proximate to ribbon end 462 is formed entirely from the unitary ribbon fiber housing boot 443, this problem is effectively avoided.

In addition, a pair of fillet-shaped beads of UV-curable adhesive 455 are applied along the corner formed between the upper and lower surfaces of ribbon fibers 449 and the ribbon end 462 of ribbon fiber housing boot 443. These further enhance the side pull strength of the optical fiber array 400 so that it provides substantially improved long-term reliability as compared with conventional designs.

A UV-curable adhesive 452 is also applied to the gap formed between the cover lid 442 and ribbon fiber housing boot 443. The adhesive 452 protects the bare fibers 448. During fabrication, the optical fiber array 400 is irradiated with UV rays to harden the adhesives.

Figure 4C:
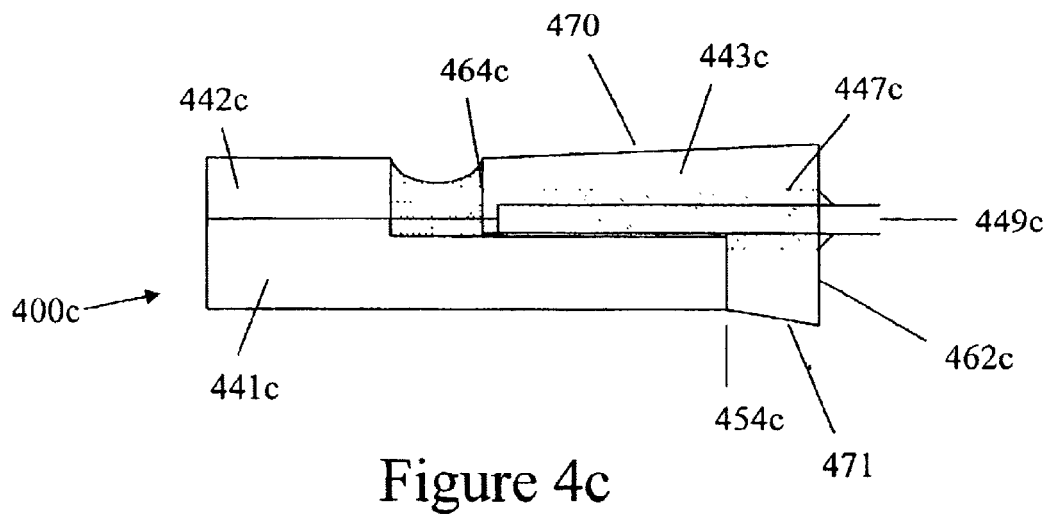
FIG. 4c is a schematic side view showing another preferred embodiment of a full-pitch optical fiber array with a ribbon-fiber housing according to the present invention.

Turning to FIG. 4c, another preferred full-pitch optical fiber array 400c is described. It includes a lower substrate 441c, a cover lid 442c, and ribbon fibers 449c. As shown, however, the upper face 470 and the lower face 471 of ribbon fiber housing boot 443c are both inclined. Thus, the ribbon fiber housing boot 443c narrows from the ribbon end 462c to the gap end 464c.

Preferably, the upper face 470 begins at ribbon end 462c at a level above the top of cover lid 442c and descends to gap end 464c where it reaches a level approximately even with the top of cover lid 442c. Similarly, the lower face 471 begins at ribbon end 462c at a level below the bottom of lower substrate 441c and ascends to step 454c where it reaches a level approximately even with the bottom of lower substrate 441c.

Although the upper face 470 and lower face 471 are inclined, the interior channel 447c retains substantially the same shape. This again provides improved side-pull strength. It also provides thicker walls of interior channel 447c near the ribbon end 462. Since this end of the ribbon fiber housing boot 443c suffers the most stress when the ribbon fibers 449c are pulled, this increased thickness provides greater strength.

Figure 4D:
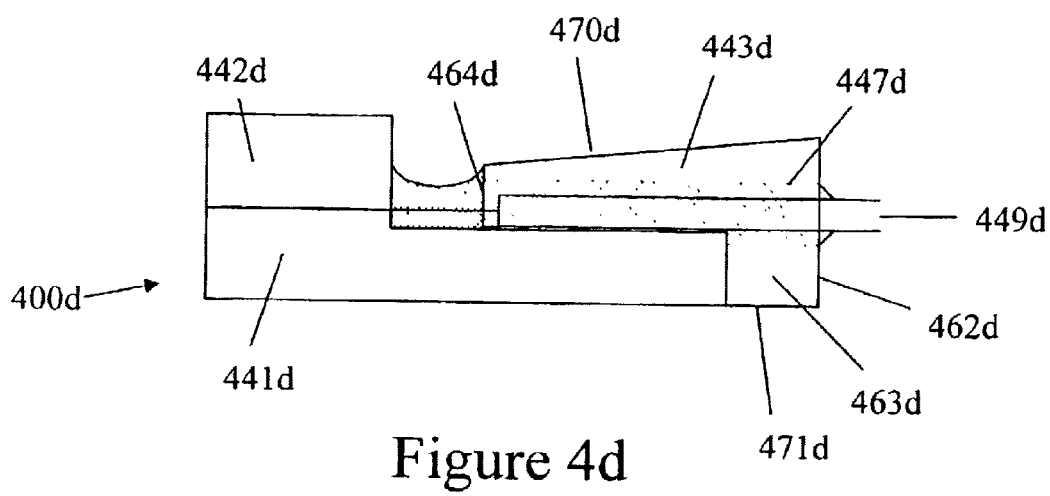
FIG. 4d is a schematic side view showing another preferred embodiment of a full-pitch optical fiber array with a ribbon-fiber housing according to the present invention.

Turning to FIG. 4d, another preferred full-pitch optical fiber array 400d is described. It includes a lower substrate 441d, a cover lid 442d, and ribbon fibers 449d. As shown, however, the upper face 470d of ribbon fiber housing boot 443d is inclined. Thus, the ribbon fiber housing boot 443d narrows from the ribbon end 462d to the gap end 464d.

In addition, the side walls 463d are inclined at least approximately five degrees so that the upper face 470d is narrower than the lower face 471d. This provides a number of important benefits. First, it aids removal from the mold during manufacture. Second, the side walls of the interior channel 447d follow the same incline. Thus, the upper portion of the interior channel 447d is narrower than the lower portion. This narrowing better matches the profile of the ribbon fiber, which also narrows toward its top surface. It also helps to further improve side pull strength.

Figure 5A:
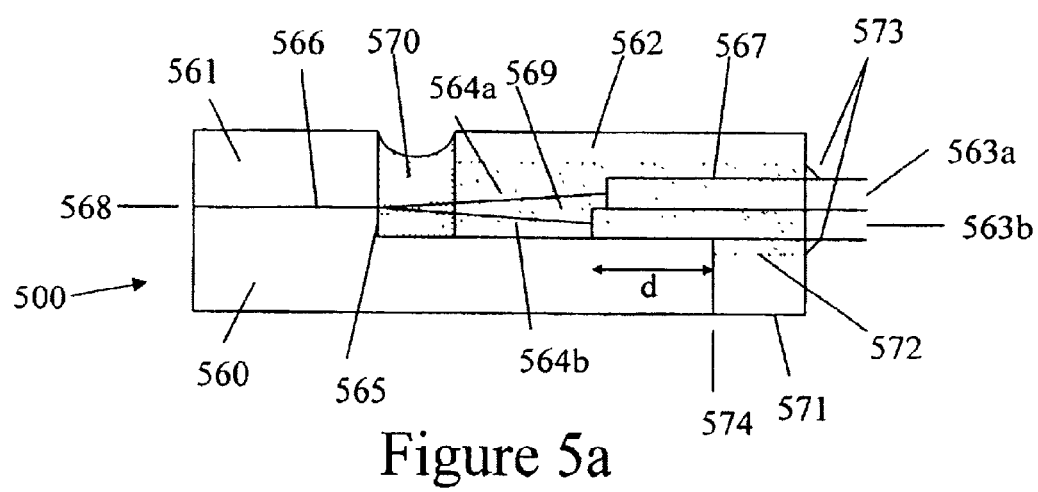
FIG. 5a is a schematic side view showing another preferred embodiment of a half-pitch optical fiber array with a ribbon-fiber housing according to the present invention.
Figure 5B:
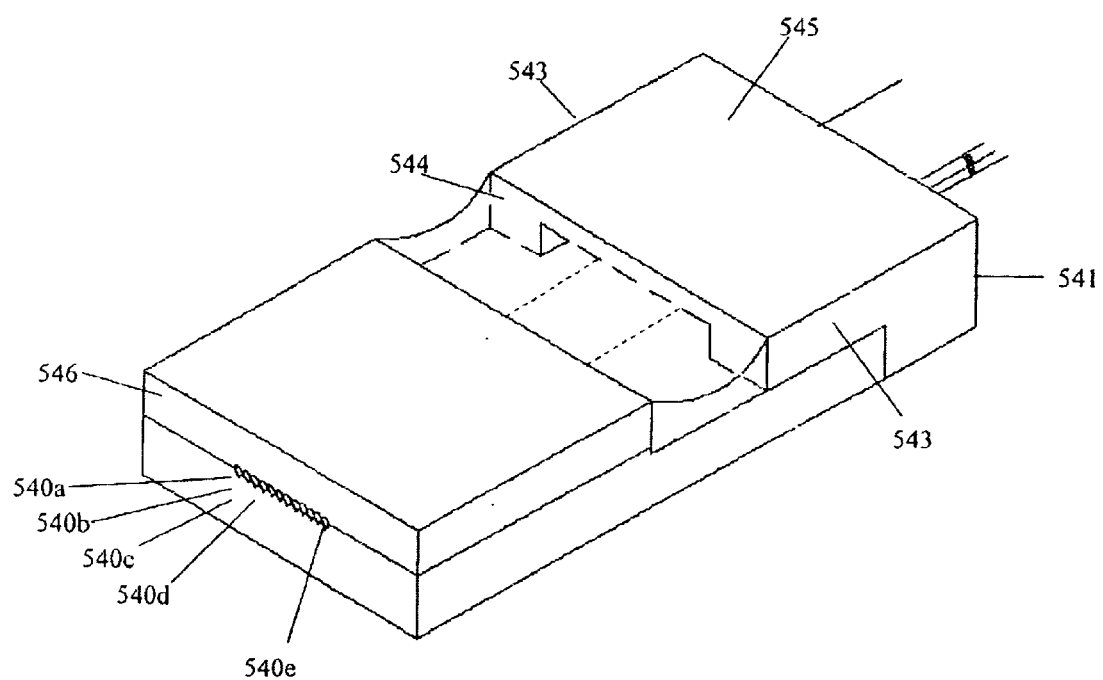

Referring now to FIGS. 5a and 5b, one preferred half-pitch optical fiber array is explained. The optical fiber array 500 includes a lower V-groove substrate 560, a cover lid 561, a ribbon fiber housing boot 562 and ribbon fibers 563a and 563b. A plurality of V-shaped grooves are formed in parallel in the upper surface of lower V-groove substrate 560. Cover lid 561 is positioned above the V-shaped grooves in the lower substrate 560 to define a plurality of enclosed channels beginning with leftmost channel 540a and extending to rightmost channel 540e. The bare fibers 564a and 564b are placed in the plurality of V-shaped grooves in the lower substrate 560 and cover lid 561 presses these bare fibers 564a and 564b in place.

The ribbon fiber housing boot 562 likewise presses the covered ribbon fibers 563a and 563b in place. More specifically, it defines an interior channel 567. On the ribbon fiber end 541 of the ribbon fiber housing boot 562, the interior channel 567 is completely defined by the ribbon housing fiber boot 562. In other words, the ribbon fiber housing boot 562 defines the top, bottom and sides of the interior channel 567 on the end proximate to ribbon end 541. For assembly, the ribbon fibers 563a and 563b are threaded through this channel 567 from the ribbon end 541.

Ribbon fiber housing boot 562 narrows at step 574 so that its side walls 543 form an L-shape (i.e., its side walls 543 each have a horizontal and vertical member). The step 574 extends into interior channel 567 so that the gap end 544 of ribbon fiber housing boot 562 has only a top 545 and the pair of side walls 543. When the ribbon fiber housing boot 562 is place on top of the lower substrate 560, the bottom of the interior channel 567 proximate the gap end 544 is formed by the lower substrate 560. Since the step 574 extends into interior channel 567 the channel narrows at that point. For assembly, the ribbon fibers 563b rest upon the upper surface of lower substrate 560, and the ribbon fibers 563a rest upon the ribbon fibers 563b. Since the portion of interior channel 567 is wider between ribbon end 541 and step 574, a correspondingly larger gap is formed between the ribbon fibers 563b and the ribbon fiber housing boot 562. A relatively even gap is formed along the top of the ribbon fibers 563a and the top of the interior channel 567.

The upper surface of lower V-groove substrate 560 also defines a step 565. The V-shaped groove section of the upper surface 566 extends from this step 565 to the joint end 546 of the optical fiber array 500. The height of step 565 is adjusted to the diameter of the ribbon fibers so as to minimize any bending and associated losses in the bare optical fibers 564a and 564b.

Preferably the ribbon fiber housing boot 562 is made of metal, engineering plastic or resin formed in a mold. When compared to the more common method of grinding a boot from a solid block, the fabrication and manufacturing costs are significantly reduced.

During assembly, the ribbon fibers 563a and 563b are run through the interior channel 567 defined by the lower substrate 560 and the ribbon fiber housing boot 562. The bare optical fibers 564a and 564b are inserted and located in the V-shaped groove section of the upper surface 566. The individual fibers from ribbon fibers 563a and 563b are mutually overlapped so that the resulting array of bare optical fibers alternate. In other words, the leftmost optical fiber 540a is run from the leftmost optical fiber in ribbon fiber 563a. The next optical fiber 540b is run from the leftmost optical fiber in ribbon fiber 563b. The next optical fiber 540c is run from the second leftmost optical fiber in ribbon fiber 563a. The next optical fiber 540d is run from the second leftmost optical fiber in ribbon fiber 563b, and so on.

The bare optical fibers (564a and 564b) extend flush with joint end 546 of the fiber array 500. An adhesive 568 is then applied between the cover lid 566 and the lower substrate 560 so that it fills, as much as possible, the gaps between V-shaped groove section of the upper surface 566 and the bare optical fibers 564a and 564b. It also bonds the cover lid 566 to the lower substrate 560.

An adhesive 569 is applied between the ribbon fiber housing boot 562 and lower substrate 560 so that it fills, as much as possible, the gaps between the interior channel 567 and the ribbon fibers 563a and 563b. More specifically, the gaps between the upper surface of the lower substrate 560 and the ribbon fibers 563b are filled with adhesive 569. Likewise, the gaps 572 between the bottom of ribbon fiber housing boot 562 and the ribbon fibers 563b are filled with adhesive 569. Because the gaps widen as they pass over step 574 to gaps 572, a thicker layer of adhesive 569 is applied. This thicker layer of adhesive 569 enhances the strength of the interface between the ribbon fibers 563b and the bottom surface of interior channel 567. A relatively thick layer of adhesive 569 is also applied along the entire gap between the ribbon fibers 563a and the upper surface of the interior channel 567. This also enhances the strength of the interface between the ribbon fibers 563a and 563b and the upper surface of interior channel 567. As the ribbon fibers 563a and 563b are pulled up or down in a side pull test, the relatively thick layer of adhesive 569 proximate the ribbon end 541 provides a small degree of flexibility so that the ribbon fibers do not experience a sharp pressure at the ribbon end 541 of ribbon fiber housing boot 562.

Figure 1:
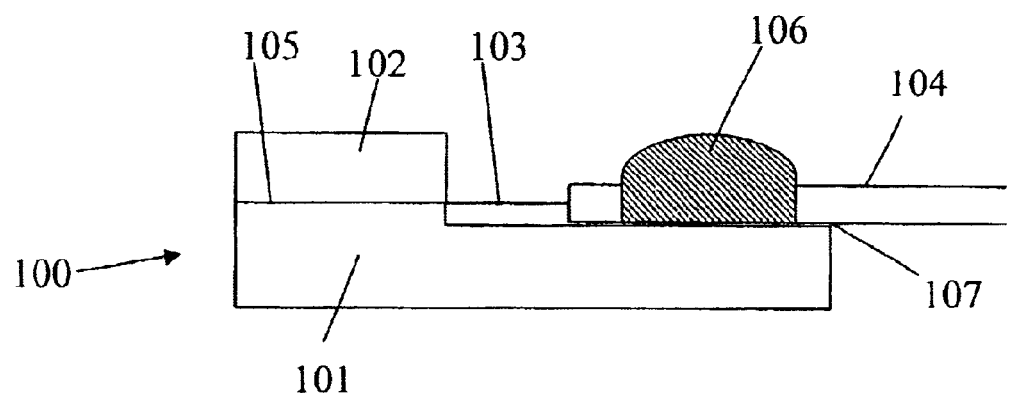
FIG. 1 is a schematic side view of a standard-type full-pitch optical fiber array.
Figure 2:
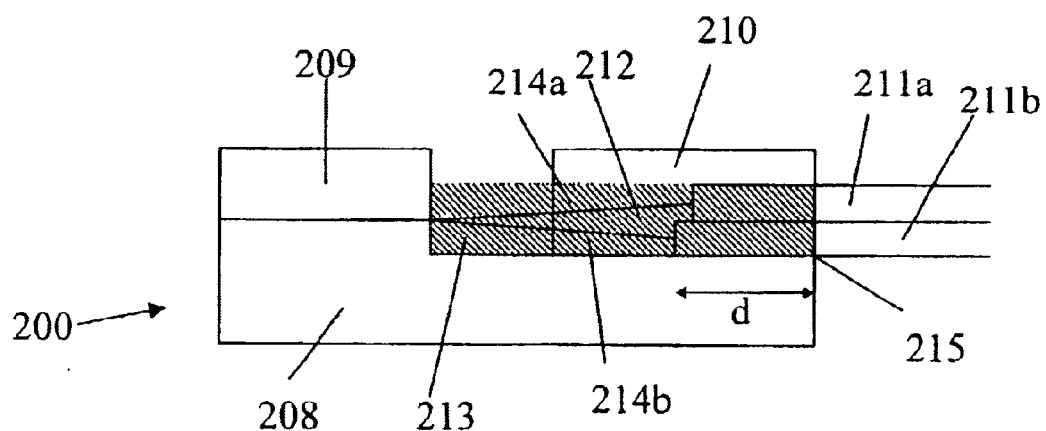
FIG. 2 is a schematic side view of a standard-type half-pitch optical fiber array.

In conventional half-pitch fiber arrays, as shown in FIG. 2, in order to minimize the bending loss of bare fibers, the length of the ribbon fibers 211a and 211b inside the housing groove 212, shown as d, is kept at or below approximately 4 mm. After some wear, cracks may easily initiate and propagate at the interface 215 between ribbon fibers 211b and the lower V-groove substrate 208. These degrade performance of the optical fiber array and may eventually lead to breaks. The present invention largely eliminates or at least greatly reduces this problem. This is accomplished in large measure by the extension 571 of housing boot 562, which defines an enlarged interior channel 562.

The adhesive 569 also bonds the ribbon fiber housing boot 562 and lower substrate 560. The shape of the side walls 543 provides two bonding surfaces (one along each interior horizontal leg and one along the interior vertical leg of the L-shaped side walls) that help to increase the strength of this joint. Specifically, the interior portion of the vertical member provides one bonding surface with the end of lower substrate 560. The bottom of the horizontal member provides a second bonding surface with the top of lower substrate 560. Together, these enhance the bond between the lower substrate 560 and the upper fiber housing boot 562.

In addition, a fillet-shaped bead of UV-curable adhesive 573 is applied along the corner formed between the upper surface of ribbon fibers 563a and the ribbon end 541 of ribbon fiber housing boot 562. Also, a fillet-shaped bead of UV-curable adhesive 573 is applied along the corner formed between the lower surface of ribbon fibers 563b and the ribbon end 541 of ribbon fiber housing boot 562. These further enhance the side pull strength of the optical fiber array 500 so that it provides substantially improved long-term reliability as compared with conventional designs.

A UV-curable adhesive 570 is also applied to the gap formed between the cover lid 561 and ribbon fiber housing boot 562. The adhesive 570 protects the bare fibers 564a and 564b. During fabrication, the optical fiber array 500 is irradiated with UV rays to harden the adhesives.

Figure 5C:
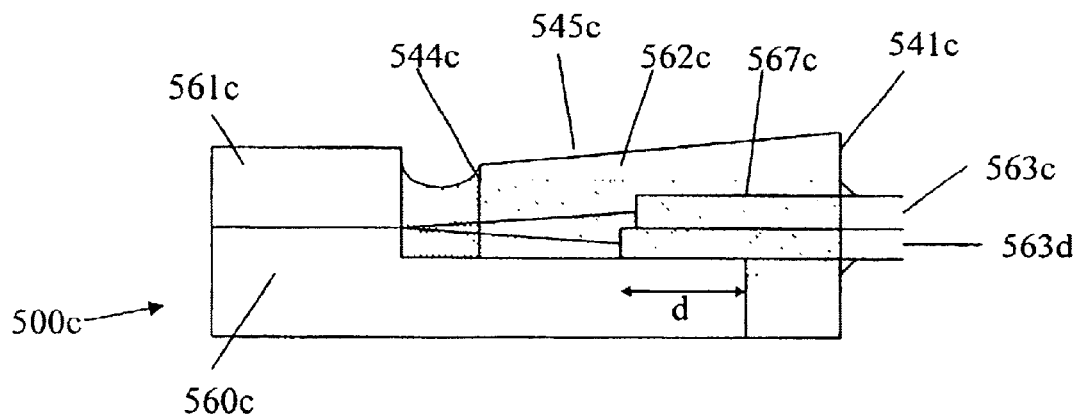
FIG. 5c is a schematic side view showing another preferred embodiment of a half-pitch optical fiber array with a ribbon-fiber housing according to the present invention.

Turning to FIG. 5c, another preferred half-pitch optical fiber array 500c is described. It includes a lower substrate 560c, a cover lid 561c, and ribbon fibers 563c and 563d. As shown, however, the upper face 545c of ribbon fiber housing boot 562c is inclined. Thus, the ribbon fiber housing boot 562c narrows from the ribbon end 541c to the gap end 544c.

Although the upper face 545c is inclined, the interior channel 567c retains substantially the same shape. This again provides improved side-pull strength. It also provides a thicker wall along the top of interior channel 567c near the ribbon end 541c. Since this end of the ribbon fiber housing boot 562c suffers the most stress when the ribbon fibers 563c and 563d are pulled, this increased thickness provides greater strength.

Figure 6:
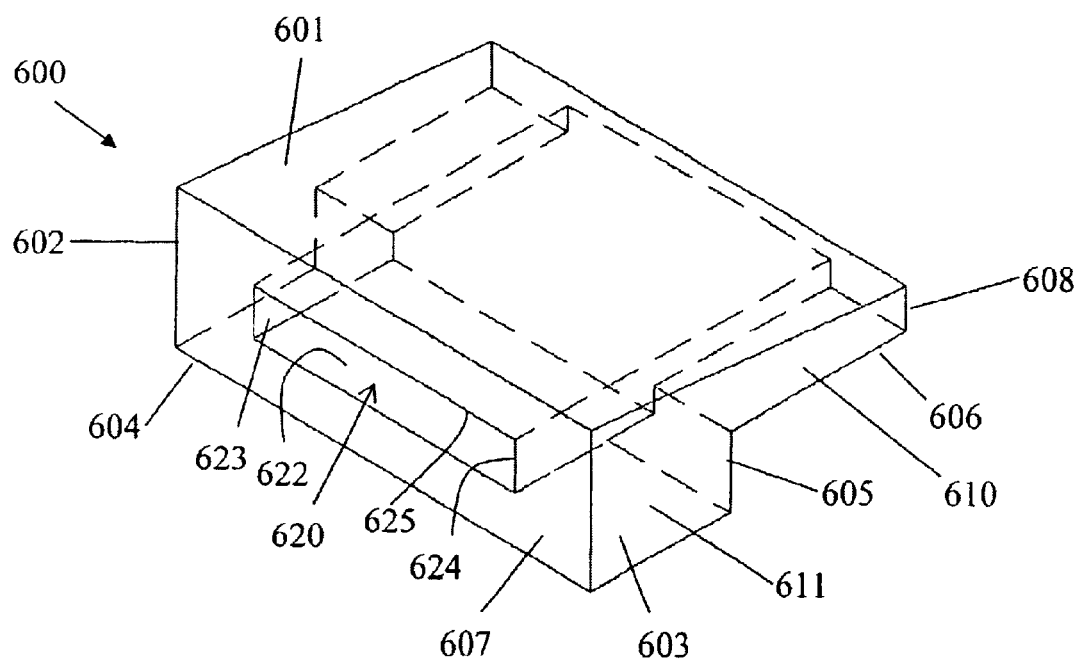
FIG. 6 is a schematic perspective view showing the ribbon-fiber housing according to the present invention.

Turning to FIG. 6, another preferred housing boot 600 is described in further detail. The outer bounds of the housing boot 600 are defined by the upper surface 601, the left side wall 602, the right side wall 603, a first lower surface 604, a step 605, a second lower surface 606, ribbon end 607 and gap end 608. The upper surface 601 is substantially rectangular. It meets the left side wall 602 and right side wall 603 along opposite edges. It meets the ribbon end 607 and the gap end 608 along opposite edges.

The left side wall 602 and the right side wall 603 each form an L-shape. In its current position, the L-shape is shown rotated clockwise by ninety degrees. The right side wall 603 has a horizontal portion 610 and a vertical portion 611. The horizontal portion 610 widens slightly as it extends from the gap end 608 toward the ribbon end 607.

The first lower surface is substantially rectangular in shape and extends between the bottom edge of the vertical portion 611 of the two side walls. The second lower surface 606 extends between the bottom edges of the horizontal portion 610 of the two side walls. The second lower surface 606 is formed by two rectangular surfaces separated by a channel described below. The step 605 joins the first lower surface 603 with the second lower surface 606. The step 605 extends between the side edge of the vertical portion 611 of the side walls.

The ribbon end 607 is also substantially rectangular in shape. It joins the right and left side walls along opposite side edges. It joins the upper surface 601 and the first lower surface 604 along its top and bottom edges. It defines a rectangular mouth of an interior channel 620 described below. The edges of the rectangular mouth of the interior channel 620 are parallel to the corresponding nearest edge of the ribbon end 607.

The gap end has an upside-down U-shape. The outer edges of the side members meet the end of horizontal portion 610 of the side walls 603. The upper edge of the horizontal member meets the upper surface 601.

The housing boot 600 is a sold defined by the outer surfaces identified above, and with an interior channel 620 running therethrough. The interior channel 620 is defined by a bottom wall 622, a left side wall 623, a right side wall 624, and a top wall 625. In addition, when used as part of an optical fiber array, the channel is further defined by the upper surface of a substrate (not shown).

More specifically, the entire second lower surface 606 rests upon the substrate, and the entire step 605 presses against the end of the substrate. Together the second lower surface 606 and the step 605 provide two adhesive surfaces for improved bonding with the substrate.

A first portion of the channel 620 begins at the gap end 608 and extends to step 605. It is defined by the left side wall 623, the right side wall 624, the top wall 625 and the upper surface of the substrate, which extends between the bottom edges of the side walls. This first portion of the channel 620 is sized just slightly larger than the dimensions of a ribbon cable when used with a full-pitch optical fiber array, and just slightly larger than the dimensions of a stack of two ribbon cables when used with a half-pitch optical fiber array. In other words, the width of the top wall 625 approximately matches the width of the ribbon cable(s). The height of the side walls at the first portion of the channel 620 approximately matches the thickness of one or two ribbon cables depending upon the application.

A second or extended portion of the channel 620 begins at the step 605 and extends to the ribbon end 607. The width of this portion of the channel 620 remains the same as the first portion. However, the height is slightly larger. In particular, the step 605 extends into the channel 620 so that it defines a boundary between the first and second portion of the channel. When placed on a substrate, the upper surface of the substrate ends at the step 605. The step 605 widens the channel as it extends from the gap end 608 to the ribbon end 607. When assembled as part of an optical fiber array, this additional height forms a gap between the bottom wall 620 and the ribbon cable(s) that run through the channel 620. This gap is filled with an adhesive that has a slight flexibility. It permits some small amount of flex so that the stress on the ribbon cables is reduced when pulled up or down. This configuration along with the other aspects of the invention described above, substantially improve the life and reliability of an optical fiber array.

Although the invention has been described above with reference to specific improved embodiments, those skilled in the art will appreciate that many modifications and additional variations are possible without departing from the spirit of the invention. All such modification and variations are intended to be encompassed within the scope of the following claims.

What is claimed is:

1. An optical fiber array comprising:
   a lower substrate having a first end and a second end opposed thereto and an upper surface extending between the first end and the second end, wherein the upper surface defines a plurality of grooves that extend across at least a portion of the upper surface;
   a ribbon cable comprising a plurality of coated optical fibers, wherein an end of the coated optical fibers are bare of the coating and wherein at least a portion of the bare end of each of the plurality of coated fibers rests in one of the plurality of grooves and extend to the first end of the lower substrate;
   a cover positioned proximate the first end of the lower substrate and over at least a portion of the bare end of each of the plurality of coated fibers and wherein the cover is bonded to the lower substrate; and
   a housing having a first end and a second end opposed thereto, a bottom surface extending between the first end and the second end of the housing, and a bottom step separating the bottom surface into an upper and a lower level, wherein the housing is bonded to the lower substrate along the upper level of the bottom surface and along the bottom step, and wherein the housing and the lower substrate define an interior channel having a first portion bounded by the lower substrate and the housing and a second portion bounded only by the housing, where the first portion of the channel meets the second portion of the channel at the bottom step and wherein the first portion of the channel is narrower than the second portion of the channel, and wherein the ribbon cable passes through the interior channel.

2. The optical fiber array of claim 1, wherein the upper surface defines an optical fiber step between the first end and the second end of the lower substrate and wherein the plurality of grooves extend from the optical fiber step to the first end of the lower substrate.

3. The optical fiber array of claim 1, wherein the plurality of grooves comprise a plurality of V-shaped grooves.

4. The optical fiber array of claim 1, wherein the ribbon cable comprises a first ribbon cable resting on a second ribbon cable, and the bare ends of the plurality of coated fibers resting in the plurality of grooves alternate between a bare end of a coated fiber from the first ribbon cable and a bare end of a coated fiber from the second ribbon cable.

5. The optical fiber array of claim 1, wherein the cover has a first end and a second end and a lower surface extending from the first end to the second end, and wherein the first end of the cover is flush with the first end of the lower substrate, and wherein the lower surface of the cover and the plurality of grooves define a plurality of parallel channels each enclosing a portion of the bare end of one of the plurality of coated fibers, and wherein the second end of the cover and the first end of the housing define a gap, and wherein at least a portion of the bare end of each of the plurality of coated fibers extends past the second end of the cover and into the gap.

6. The optical fiber array of claim 5, further comprising at least one adhesive covering the portion of the bare end of each of the plurality of coated fibers that extend past the second end of the cover and into the gap.

7. The optical fiber array of claim 1, wherein the housing further comprises a pair of inclined L-shaped walls extending upward from the bottom surface and extending from the first end to the second end of the housing.

8. The optical fiber array of claim 1, wherein the housing and the ribbon cable define an upper gap that extends along an upper surface of the ribbon cable and a lower gap that extends along at least a portion of a lower surface the ribbon cable, and wherein a first height of the first portion of the interior channel approximately matches that of the ribbon cable and the upper gap, and wherein a second height of the second portion of the interior channel approximately matches that of the ribbon cable, the upper gap and the lower gap, so that the second height of the second portion of the interior channel is greater than the first height of the first portion of the interior channel.

9. The optical fiber array of claim 8, further comprising at least one adhesive that substantially fills the upper gap and the lower gap and that defines a pair of beads one of which extending along an upper corner defined by the second end of the housing and an upper face of the ribbon cable and one of which extending along a lower corner defined by the second end of the housing and a lower face of the ribbon cable.

10. The optical fiber array of claim 1, wherein:
the upper surface defines an optical fiber step between the first end and the second end of the lower substrate and wherein the plurality of grooves extend from the optical fiber step to the first end of the lower substrate;
the cover has a first end and a second end and a lower surface extending from the first end to the second end, and wherein the first end of the cover is flush with the first end of the lower substrate, and wherein the lower surface of the cover and the plurality of grooves define a plurality of parallel channels each enclosing a portion of the bare end of each of the plurality of coated fibers, and wherein the second end of the cover and the first end of the housing define a gap, and wherein at least a portion of the bare end of each of the plurality of coated fibers extends past the second end of the cover and into the gap;
the housing and the ribbon cable define an upper gap that extends along an upper surface of the ribbon cable and a lower gap that extends along at least a portion of a lower surface of the ribbon cable, and wherein a first height of the first portion of the interior channel approximately matches that of the ribbon cable and the upper gap, and wherein a second height of the second portion of the interior channel approximately matches that of the ribbon cable, the upper gap and the lower gap, so that the second height of the second portion of the interior channel is greater than the first height of the first portion of the interior channel by a step height of the bottom step; and
at least one adhesive substantially fills the upper gap and the lower gap and defines a pair of beads one of which extends along an upper corner defined by the second end of the housing and the upper surface of the ribbon cable and one of which extends along a lower corner defined by the second end of the housing and the lower surface of the ribbon cable.

11. An optical fiber array comprising:
a substrate having a joint end and a housing end and an upper surface extending between the joint end and the housing end, wherein the upper surface defines a plurality of parallel grooves extending along at least a portion of the upper surface;
a cover positioned over at least a portion of the plurality of parallel grooves so that the cover and the substrate define a plurality of parallel channels each bounded by one of the plurality of parallel grooves and the cover;
a housing joined to the substrate along at least a portion of the upper surface of the substrate and at least a portion of the housing end of the substrate, wherein the housing comprises a pair of side walls each having a horizontal leg and a vertical leg and wherein the housing is bonded to the upper surface of the substrate along the horizontal leg of the side walls and wherein the housing is bonded to the housing end of the substrate along the vertical leg of the side walls, and wherein the housing defines an interior channel having a step that separates the interior channel into a wide portion and a narrow portion; and
a ribbon fiber cable having a plurality of individual optical fibers that terminate in a bare end, wherein the ribbon fiber cable first passes through the wide portion of the interior channel, then through the narrow portion of the interior channel and then wherein at least a portion of the bare end of each of the plurality of individual optical fibers pass through a respective one of the plurality of parallel channels to terminate approximately even with the joint end of the substrate.

12. The optical fiber array of claim 11, wherein the upper surface of the substrate defines a step and wherein the plurality of parallel grooves extend from the step to the joint end of the substrate.

13. The optical fiber array of claim 11, wherein the cover and the housing are joined to the substrate so that they define a step gap through which at least a portion of the bare end of each of the plurality of individual optical fibers pass through before entering the plurality of channels.

14. The optical fiber array of claim 13, further comprising at least one adhesive covering the portion of the bare end of each of the plurality of individual optical fibers that pass through the step gap.

15. The optical fiber array of claim 11, wherein the plurality of individual optical fibers of the ribbon fiber cable are arranged in parallel along a single plane.

16. The optical fiber array of claim 11, wherein the ribbon fiber cable comprises an upper and a lower ribbon fiber cable, and wherein the plurality of individual optical fibers of the upper and lower ribbon fiber cables are intermingled as they the pass through the plurality of parallel channels.

17. The optical fiber array of claim 11, wherein the narrow portion of the interior channel is further defined by the upper surface of the substrate at least along a bottom wall of the narrow portion of the channel.

18. The optical fiber array of claim 11, wherein:

the upper surface of the substrate defines a step and wherein the plurality of parallel grooves extend from the step to the joint end of the substrate;

the cover and the housing are joined to the substrate so that they define a step gap through which at least a portion of the bare end of each of the plurality of individual optical fibers pass through before entering the plurality of channels;

the housing comprises a pair of side walls each having a horizontal leg and a vertical leg and wherein the housing is bonded to the upper surface of the substrate along the horizontal leg of the side walls and wherein the housing is bonded to the housing end of the substrate along the vertical leg of the side walls;

the narrow portion of the interior channel is further defined by the upper surface of the substrate at least along a bottom wall of the narrow portion of the channel; and wherein the optical fiber array further comprises at least one adhesive that bonds the cover and the housing to the substrate, and that covers the portion of the bare end of each of the plurality of individual optical fibers as they pass through the step gap, and that defines an upper fillet-shaped bead along an upper corner defined between an upper surface of the ribbon fiber cable and the housing and a lower fillet-shaped bead along a lower corner defined between a lower surface of the ribbon fiber cable and the housing.

19. An optical fiber array especially suited for joining optical fibers comprising:

a substrate having an upper surface extending between a first and a second end of the substrate, wherein the upper surface defines a plurality of grooves and a step and wherein the plurality of grooves extend from the first end of the substrate to the step;

a plurality of coated optical fibers extending across the upper surface of the substrate and resting in the plurality of groves defined by the upper surface, wherein the plurality of coated optical fibers have a bare end flush with the first end of the substrate, and wherein the plurality of coated optical fibers extends beyond the second end of the of the substrate;

a cover having a lower surface extending between a first and a second end of the cover, wherein the lower surface defines a plurality of grooves complementary to the plurality of grooves defined in the upper surface, and wherein the lower surface of the cover rests upon the upper surface of the substrate so that the first end of the cover is flush with the first end of the substrate and the bare end of the plurality of coated optical fibers and so that a portion of the bare end of the plurality of coated optical fibers are sandwiched between the substrate and the cover, and wherein the bare end of the plurality of coated optical fibers extends beyond the second end of the cover, and wherein the cover extends from the first end of the substrate to the step, so that the second end of the cover meets the step; and an adhesive bound to the substrate, the plurality of coated optical fibers and the cover, wherein the adhesive covers the bare portion of the plurality of optical fibers and wherein the adhesive forms a first continuous bead along a first interior corner joint of the plurality of coated optical fibers.

20. The optical fiber array of claim 19, further comprising housing having a top and a pair of side walls extending down along opposite sides of the top from a first end second end of top so that top and the pair side walls define an interior channel, and wherein the pair of side walls rest upon the upper surface of the substrate so that portion of the plurality of coated optical fibers are enclosed by the housing, and further wherein the adhesive is bound to the first end of the top and fills a gap defined between the second end the cover and the first end of the top.

21. The optical fiber array of claim 20, wherein only a portion of the side walls of the housing rest upon the upper surface of the substrate, and wherein a portion of the side walls of the housing extend past the second end of the substrate so that the side walls form an L-shape.

22. The optical fiber array of claim 20, wherein the pair of side walls of the housing are inclined so that the side walls meet the top at an obtuse angle.

23. The optical fiber array of claim 20, wherein the substrate further has a pair of side walls extending from the first end to the second end and wherein the pair of side walls of the housing meet the substrate proximate the side walls of the substrate and wherein the side walls of the top are inclined with respect to the side walls of the substrate.

24. The optical fiber array of claim 20, wherein the adhesive forms a second continuous bead along a second interior corner joint of the plurality of covered optical fibers.

25. The optical fiber array of claim 24, wherein the first continuous bead defines a concave surface, and wherein the second continuous bead defines a concave surface.

26. The optical fiber array of claim 19, wherein the plurality of coated optical fibers comprise a first ribbon of coated optical fibers connected in parallel along a width of the ribbon.

27. The optical fiber array of claim 19, wherein the plurality of coated optical fibers comprise a second ribbon of coated optical fibers separate from the first ribbon of coated optical fibers, and wherein the first ribbon of coated optical fibers rest in the plurality of groves defined by the upper surface of the substrate, and wherein a portion of the bare end of the coated optical fibers of both the first and second ribbon are sandwiched between the substrate and the cover.

* * * * *